US007760593B2

(12) United States Patent
Watanabe

(10) Patent No.: US 7,760,593 B2
(45) Date of Patent: Jul. 20, 2010

(54) INFORMATION/RECORDING/REPRODUCING APPARATUS INCLUDING ΔΣ CONVERSION CIRCUIT

(75) Inventor: Fumito Watanabe, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/672,178

(22) Filed: Feb. 7, 2007

(65) Prior Publication Data

US 2007/0201328 A1    Aug. 30, 2007

(30) Foreign Application Priority Data

Feb. 28, 2006    (JP)    ............... 2006-052557

(51) Int. Cl.
*G11B 7/00* (2006.01)
(52) U.S. Cl. ................ 369/44.41; 369/124.12
(58) Field of Classification Search ............. 369/44.41, 369/44.42, 124.01, 124.04, 124.12, 124.13
See application file for complete search history.

(56) References Cited

U.S. PATENT DOCUMENTS 6,741,533 B1 *    5/2004    Hiratsuka et al.    ........ 369/44.41

7,187,629 B2 *    3/2007    Cheng    ............... 369/44.25
2005/0180276 A1    8/2005    Watanabe et al.    ........ 369/44.29
2005/0281156 A1    12/2005    Watanabe    ............... 369/47.11

FOREIGN PATENT DOCUMENTS

JP    2001-307345    11/2001

* cited by examiner

*Primary Examiner*—Nabil Z Hindi
(74) *Attorney, Agent, or Firm*—Fitzpatrick, Cella, Harper & Scinto

(57) ABSTRACT

Provided is an information recording/reproducing apparatus which can perform servo control with a simple circuit structure and can be manufactured at a low cost. Analog output signals from a plurality of separate portions of a photosensor which receive reflected light from an optical disk are converted into one-bit digital outputs using a plurality of ΔΣ conversion circuits; the one-bit output signals of the plurality of ΔΣ conversion circuits are arithmetically operated using an arithmetic circuit to generate an n-bit (n>1) servo error signal. Further, the servo error signal of the arithmetic circuit is converted into an m-bit (m>n) servo error signal by a single decimation filter.

3 Claims, 8 Drawing Sheets

INFORMATION/RECORDING/REPRODUCING APPARATUS INCLUDING ΔΣ CONVERSION CIRCUIT

BACKGROUND OF THE INVENTION

1. Field of the Invention

The present invention relates to an information recording/reproducing apparatus for recording/reproducing information to or from an information recording medium such as an optical disk, and more particularly, to servo control such as focus control or tracking control.

2. Description of the Related Art

Up to now, a recording/reproducing apparatus using an optical disk as a recording medium performs servo control to cause a spot of laser light emitted from a laser light source of a pickup at the time of recording/reproduction to follow the center of a desirable track on the optical disk.

FIG. 6 shows a fundamental structure of a servo control device of an optical disk apparatus. When the optical disk apparatus starts a recording/reproduction operation, a spindle motor 2 rotates and then a laser light source (not shown) of a pickup 3 is turned on. After the laser light source is turned on, light reflected by the optical disk 1 is received by a plurality of photosensors (not shown) separated from one another in the pickup 3 and converted into current signals. The respective current signals detected by the plurality of photosensors are converted into a plurality of voltage signals by a plurality of I-V conversion circuits (not shown).

A focus error generation circuit 4 generates a focus error signal based on outputs from the plurality of I-V conversion circuits. The magnitude of the focus error signal indicates a deviation amount between a focal point of a light spot and a recording surface of the optical disk 1. An A-D conversion circuit 5 converts the focus error signal into a digital value. A focus phase compensation circuit 6 performs phase compensation processing on the focus error signal converted into the digital value.

An output from the focus phase compensation circuit 6 is sent to a focus servo gain circuit 7 which performs multiplication processing of a focus servo loop gain. An output from the focus servo gain circuit 7 is input into a focus actuator driver circuit 8. The focus actuator driver circuit 8 generates a drive signal for driving a focus actuator (not shown) of the pickup 3 based on the output from the focus servo gain circuit 7. An objective lens (not shown) of the pickup 3 is driven in a focus direction based on the drive signal.

Therefore, the focus control is performed such that the spot of the light emitted from the laser light source is focused on the recording surface of the optical disk 1.

In the same manner, a tracking error generation circuit 9 generates a tracking error signal based on the outputs from the plurality of I-V conversion circuits. The magnitude of the tracking error signal indicates a deviation amount in a radius direction of the optical disk 1 between the track center and the light spot on the optical disk 1. The tracking error signal is converted into a digital value by an A-D conversion circuit 10. As is the case with the focus control, a tracking phase compensation circuit 11 performs phase compensation processing.

Then, a tracking servo gain circuit 12 performs multiplication processing of a servo loop gain. A tracking actuator driver circuit 13 generates a drive signal for driving a tracking actuator (not shown) of the pickup. The tracking control is performed to follow the center of a desirable track on the optical disk 1 with a light spot based on the drive signal.

In each of the focus and tracking servo systems, the A-D conversion circuit used is normally a successive approximation A-D conversion circuit. In order to perform focus or tracking control with high accuracy, the A-D conversion circuit requires high accuracy, that is, high resolution. However, an increase in the resolution of the A-D conversion circuit results in an increase in cost of the A-D conversion circuit.

A configuration of a focus servo system such as shown in FIG. 7 is proposed in Japanese Patent Application Laid-Open No. 2001-307345. In FIG. 7, the elements which have the same functions as those shown in FIG. 6 are identified by like reference numerals. FIG. 7 shows in detail the focus servo system, in particular, a portion related to the generation of the focus error signal. The same structure can be applied to the tracking servo system.

When the recording/reproduction on an optical disk starts in the focus servo system, a spindle motor rotates and the optical disk is irradiated with a spot of light from a laser light source of a pickup. The focus/tracking servo control starts after the laser light source is turned on.

When the focus control is to be started, reflected light from the optical disk is received by a photosensor 14 which is separated into four light receiving portions (sensor portions) "A" to "D" in the pickup. Each of the light receiving portions "A" to "D" of the photosensor 14 generates a current signal corresponding to the amount of reflected light. The current signals are converted into voltage signals by I-V conversion circuits 15 to 18. The voltage signals are converted into one-bit digital signals by ΔΣ conversion circuits 19 to 22.

FIG. 8 shows a fundamental structure of each of the ΔΣ conversion circuits 19 to 22. In FIG. 8, input signals are the voltage signals from the I-V conversion circuits 15 to 18 shown in FIG. 7. Each of the ΔΣ conversion circuits 19 to 22 includes an integrator 28, a comparator 29 for binarizing an output from the integrator 28 to generate a one-bit output signal, a delay device 30 for delaying an output of the comparator 29 by a time corresponding to one sample, and a subtraction circuit 27 for performing subtraction between an output from the delay device 30 and the input signal.

The voltage signals generated based on the outputs from the four light receiving portions of the photosensor 14 are converted into one-bit digital data by ΔΣ conversion circuits 19 to 22 shown in FIG. 8. The respective one-bit data are input into decimation filters 23 to 26.

The decimation filters 23 to 26 convert the input one-bit data into data which have a sampling frequency lower than sampling frequency of the ΔΣ conversion circuits 19 to 22 and have multi-bit information. The multi-bit data obtained by the conversion are input into the focus error generation circuit 4. The focus error generation circuit 4 generates a focus error signal based on the plurality of multi-bit data output from the photosensor 14.

For example, when an astigmatic focus error detection method is used to generate a focus error signal, an arithmetic operation corresponding to (A+C)−(B+D) of the photosensor 14 is performed based on the multi-bit digital signals converted from the voltage signals output from the photosensor 14 to thereby generate the focus error signal. The focus phase compensation circuit 6 performs phase compensation processing on the generated focus error signal.

An output from the focus phase compensation circuit 6 is sent to the focus servo gain circuit 7, and after performing multiplication processing of a focus servo loop gain, an output from the focus servo gain circuit 7 is input into the focus actuator driver circuit 8. An output from the focus actuator driver circuit 8 drives the focus actuator in the pickup to perform the focus servo control.

Similarly, when the tracking servo control is to be performed, voltage signals generated based on the outputs from the photosensor 14 are input into the ΔΣ conversion circuits, and the outputs from the ΔΣ conversion circuits are input into the decimation filters. Then, a predetermined arithmetic operation is performed based on the outputs from the decimation filters to generate a tracking error signal, thereby performing the tracking servo control.

As described above, in the conventional servo control device, the outputs from the photosensor are converted into one-bit data by the ΔΣ conversion, and each of the focus error signal and the tracking error signal is generated based on the data obtained by converting the one-bit data into multi-bit data by the decimation filters. In such a configuration, an A-D converter with a high resolution is not necessary and servo control can be realized with high accuracy.

As described above, the conventional servo control device includes the ΔΣ conversion circuit for each of the voltage signals generated by the separated portions of the photosensor and the decimation filters for converting the output of the ΔΣ conversion circuit into the multi-bit data. For example, when a focus error signal of the servo control device is to be generated by arithmetic operation of the four sensor outputs according to an astigmatic focus error detection method, four ΔΣ conversion circuits and four decimation filters are necessary.

Further, when a tracking error signal is to be generated by arithmetic operation of the eight sensor outputs according to a differential push-pull method, eight ΔΣ conversion circuits and eight decimation filters are necessary.

As described above, for example, when an astigmatic focus error detection method as a system of generating a focus error signal and a differential push-pull method as a system of generating a tracking error signal are adopted to perform focus servo control and tracking servo control, eight ΔΣ conversion circuits and eight decimation filters are necessary on the assumption that the ΔΣ conversion circuits and the decimation filters are commonly used for both the focus servo control and the tracking servo control.

Moreover, there is a possibility that the numbers of the necessary ΔΣ conversion circuits and the necessary decimation filters may increase depending on the system of generating a servo error signal. Therefore, it is necessary to provide a large number of decimation filters depending on the servo system, thereby increasing the circuit scale. In addition, there has been a problem that the production cost is increased by the increase in the circuit scale.

SUMMARY OF THE INVENTION

The present invention provides an information recording/reproducing apparatus, including: a photosensor having a plurality of divided portions, for receiving a reflected light from an information recording medium; a plurality of ΔΣ conversion circuits for converting analog output signals from the plurality of divided portions of the photosensor into one-bit digital outputs; an arithmetic circuit for arithmetically operating the one-bit output signals of the plurality of ΔΣ conversion circuits to generate an n-bit (n>1) servo error signal; and a decimation filter for converting the servo error signal from the arithmetic circuit into an m-bit (m>n) servo error signal.

Further features of the present invention will become apparent from the following description of exemplary embodiments with reference to the attached drawings.

DESCRIPTION OF THE EMBODIMENTS

Hereinafter, embodiments of the present invention will be described in detail with reference to the attached drawings.

First Embodiment

Figure 1:
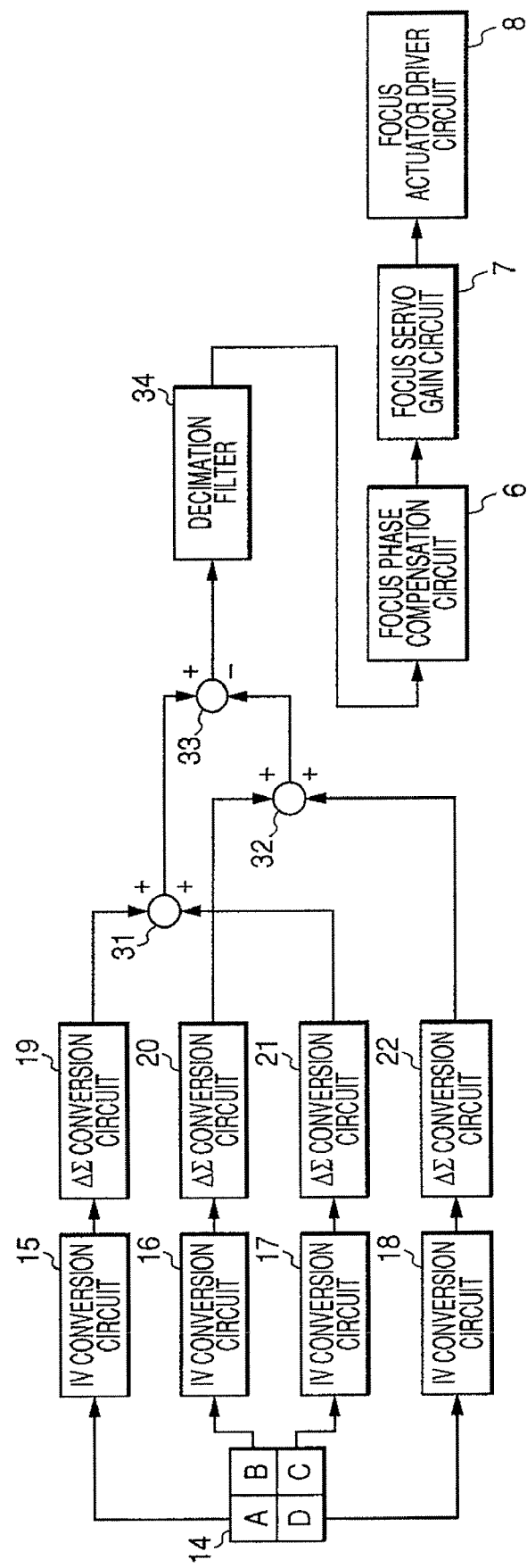
FIG. 1 is a block diagram illustrating first Embodiment of the present invention.
Figure 6:
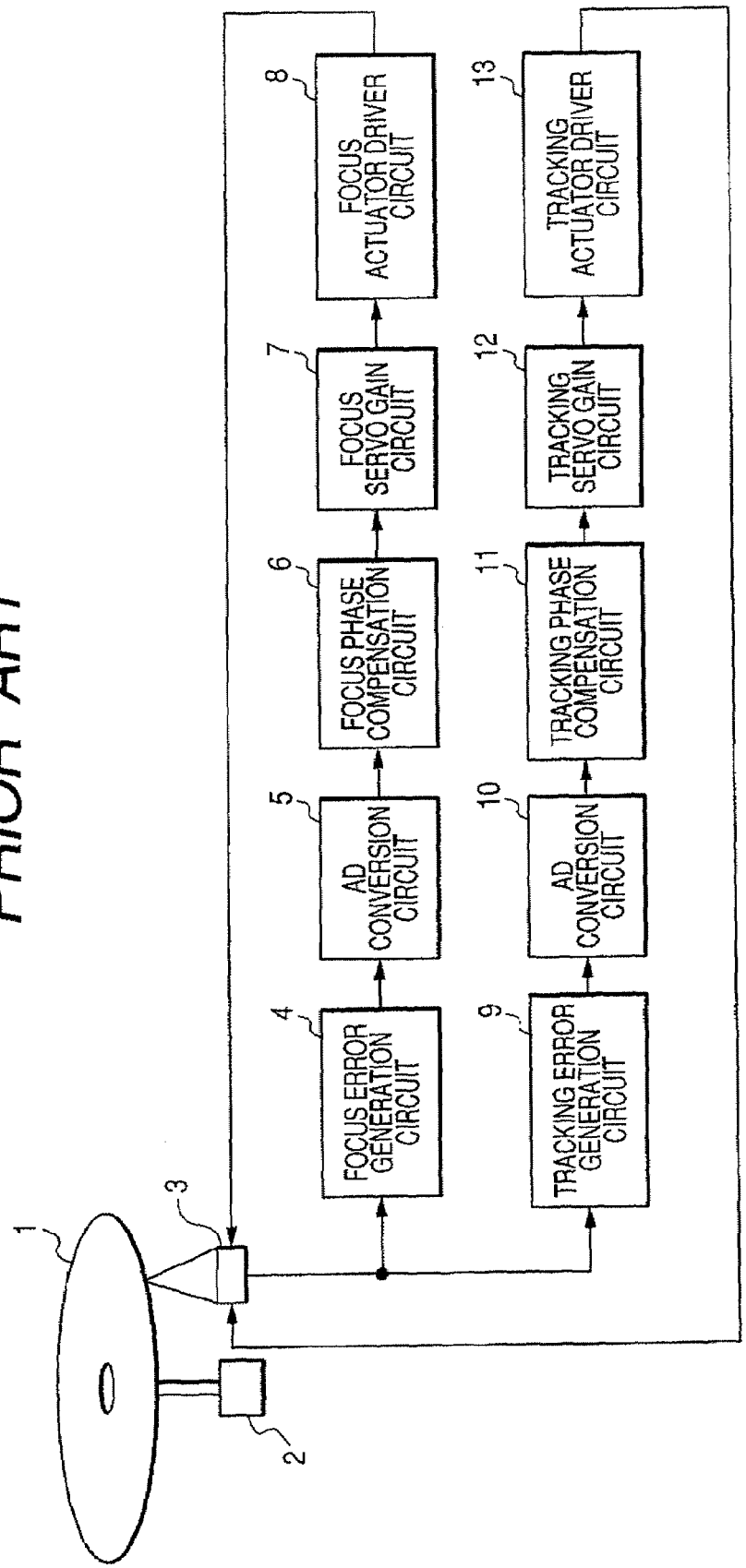
FIG. 6 is a block diagram illustrating a conventional optical disk apparatus.
Figure 7:
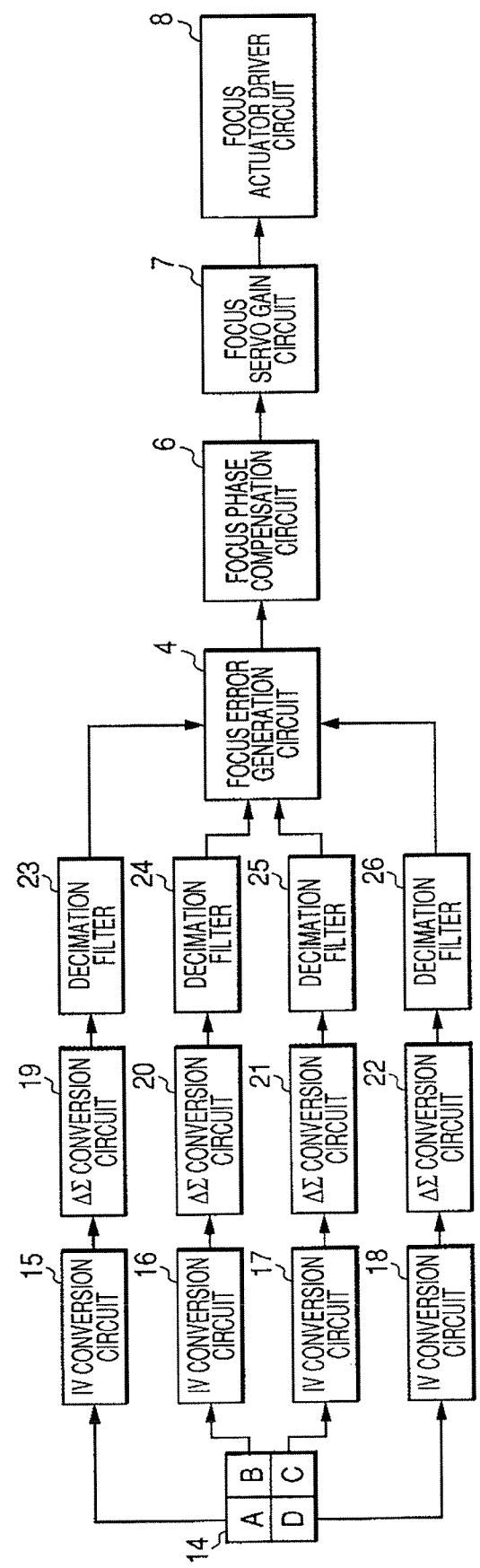
FIG. 7 is a block diagram illustrating a conventional focus servo system.

FIG. 1 is a block diagram illustrating first Embodiment of the present invention. In FIG. 1, the blocks which have the same functions as those shown in FIGS. 6 and 7 are identified by like reference numerals. Further, FIG. 1 illustrate in detail a portion related to the generation of a focus error signal according to the present invention. The optical disk 1, the spindle motor 2, and the pickup 3 such as shown in FIG. 6 and the other circuits necessary to record or reproduce information to or from the optical disk 1 are well known and are therefore not illustrated here. The pickup 3 includes a laser light source, an objective lens, the photosensor 14 having the four divided portions, a focus actuator, a tracking actuator, and the like.

When the apparatus is turned on, or when a recording or reproducing operation to or from the optical disk 1 is started, the spindle motor 2 rotates. When the rotation frequency of the spindle motor 2 reaches a predetermined value, the optical disk 1 is irradiated with laser light from the pickup 3.

Next, focus control is started for allowing the laser light to be condensed on the recording surface of the optical disk 1 through the objective lens of the pickup 3. A method of generating a focus error signal which is a signal indicating a difference in distance between a focused focal point and the recording surface of the optical disk 1 according to the present invention will be described in detail. In the present embodiment, the method of generating a focus error signal will be described by taking as an example a method based on an astigmatic focus error detection method. However, it is to be noted that the present invention can also be applied to other methods of generating a focus error signal.

The laser light irradiated to the optical disk 1 through the objective lens of the pickup 3 is reflected by the optical disk 1. The reflected light is incident on the four light receiving portions of the photosensor 14 of the pickup 3 through a known optical system. The incident light is converted into a current signal corresponding to the amount of light by each of the four light receiving portions "A" to "D" of the photosensor 14. After that, the current signals are converted into voltage signals by the I-V conversion circuits 15 to 18.

Figure 8:
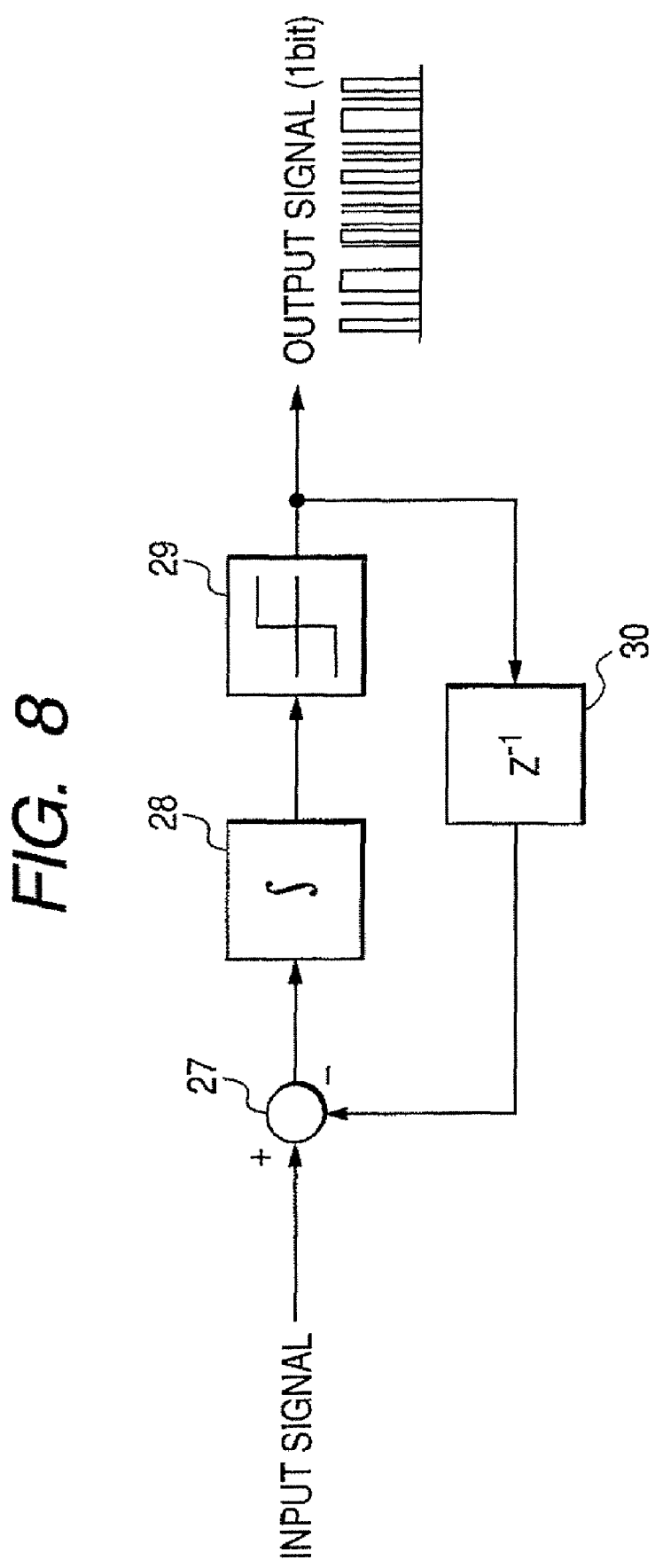
FIG. 8 is a block diagram illustrating a configuration example of a ΔΣ conversion circuit.

The voltage signals corresponding to the amounts of light which has been reflected by the optical disk 1 and incident on the four light receiving portions "A" to "D" of the photosensor 14 are input into the ΔΣ conversion circuits 19 to 22. Each of the ΔΣ conversion circuits 19 to 22 has the structure shown in FIG. 8 and is operative to convert each of the voltage signals into one-bit information, and the voltage signals from the light receiving portions "A" to "D" of the photosensor 14 are converted into one-bit signals, respectively.

The sampling frequency of the AZ conversion circuits is set to be sufficiently higher than a sampling frequency for processing of each of the subsequent circuits including the focus phase compensation circuit. For example, the sampling frequency for processing in the focus phase compensation circuit is 100 kHz, while the sampling frequency of the AZ conversion circuits is 10 MHz, so that the sampling frequency of the AZ conversion circuits is sufficiently high.

In a state in which each of the voltage signals from the light receiving portions "A" to "D" of the photosensor 14 has been converted into the one-bit signal by the corresponding one of the AZ conversion circuits, the focus error signal is generated by the astigmatic focus error detection method.

An adder 31 adds the outputs from the ΔΣ conversion circuits 19 and 21, that is, the one-bit signals based on the amounts of light incident on the light receiving portions "A" and "C" of the photosensor 14, to each other. Each of the inputs into the adder 31 has a bit width of one bit and the output therefrom has a bit width of two bits.

An adder 32 adds the outputs from the ΔΣ conversion circuits 20 and 22, that is, the one-bit signals based on the amounts of light incident on the light receiving portions "B" and "D" of the photosensor 14, to each other. Each of the inputs into the adder 32 has a bit width of one bit and the output therefrom has a bit width of two bits.

The signals each with two-bit information of (A+C) from the adder 31 and (B+D) from the adder 32 are input into a subtracter 33. Each of the inputs into the subtracter 33 has a bit width of two bits and the output therefrom has a bit width of three bits. The three-bit signal which is the output of the subtracter 33 becomes a focus error signal according to the astigmatic focus error detection method.

The three-bit signal is input into a decimation filter 34 and converted into a signal which has a sampling frequency lower than the sampling frequency of the ΔΣ conversion circuits and a bit width of at least three bits to become the focus error signal. The output of the decimation filter 34 is input into the focus phase compensation circuit 6. The timing at which the output of the decimation filter 34 is read by the focus phase compensation circuit 6 is sufficiently lower than each of the operating frequencies of the ΔΣ conversion circuits and the decimation filter 34.

After that, as is the case with FIG. 7, the output of the focus phase compensation circuit 6 is sent to the focus servo gain circuit 7, and after the multiplication processing, input into the focus actuator driver circuit 8. An output of the focus actuator driver circuit 8 drives a focus actuator in the pickup 3, thereby performing the focus servo control.

In the present embodiment, the outputs from the photosensor 14 are converted into the one-bit signals by the ΔΣ conversion circuits. Then, the one-bit signals are subjected to addition/subtraction processing. Therefore, the arithmetic operation for the servo error signal can be performed with a small number of bits.

Further, because an analog circuit or the like for performing arithmetic operation of the servo error signal is unnecessary, a servo system for an optical disk drive can be constituted with a very simple circuit structure. In the conventional technique in which outputs from a photosensor are input into ΔΣ conversion circuits to be converted into one-bit information signals, the one-bit information signals based on the outputs from the photosensor are input into the respective decimation filters 23 to 26.

However, with such configuration, for example, when the method of generating a focus error signal is an astigmatic focus error detection method, four decimation filters are necessary, thereby complicating the circuit structure. In addition, because a servo error signal needs to be obtained by arithmetic operation using the outputs from the photosensor which have bit numbers increased by the decimation filters, the circuit structure is complicated.

In contrast to this, the method of generating a focus error signal according to this embodiment necessitates only one decimation filter, so that the circuit structure becomes much simpler than the conventional circuit structure.

Second Embodiment

Next, second Embodiment of the present invention will be described. Although the method of generating a focus error signal for the focus servo control is described in first Embodiment, a tracking error signal for tracking servo control can also be generated according to the present invention in the same manner.

Figure 2:
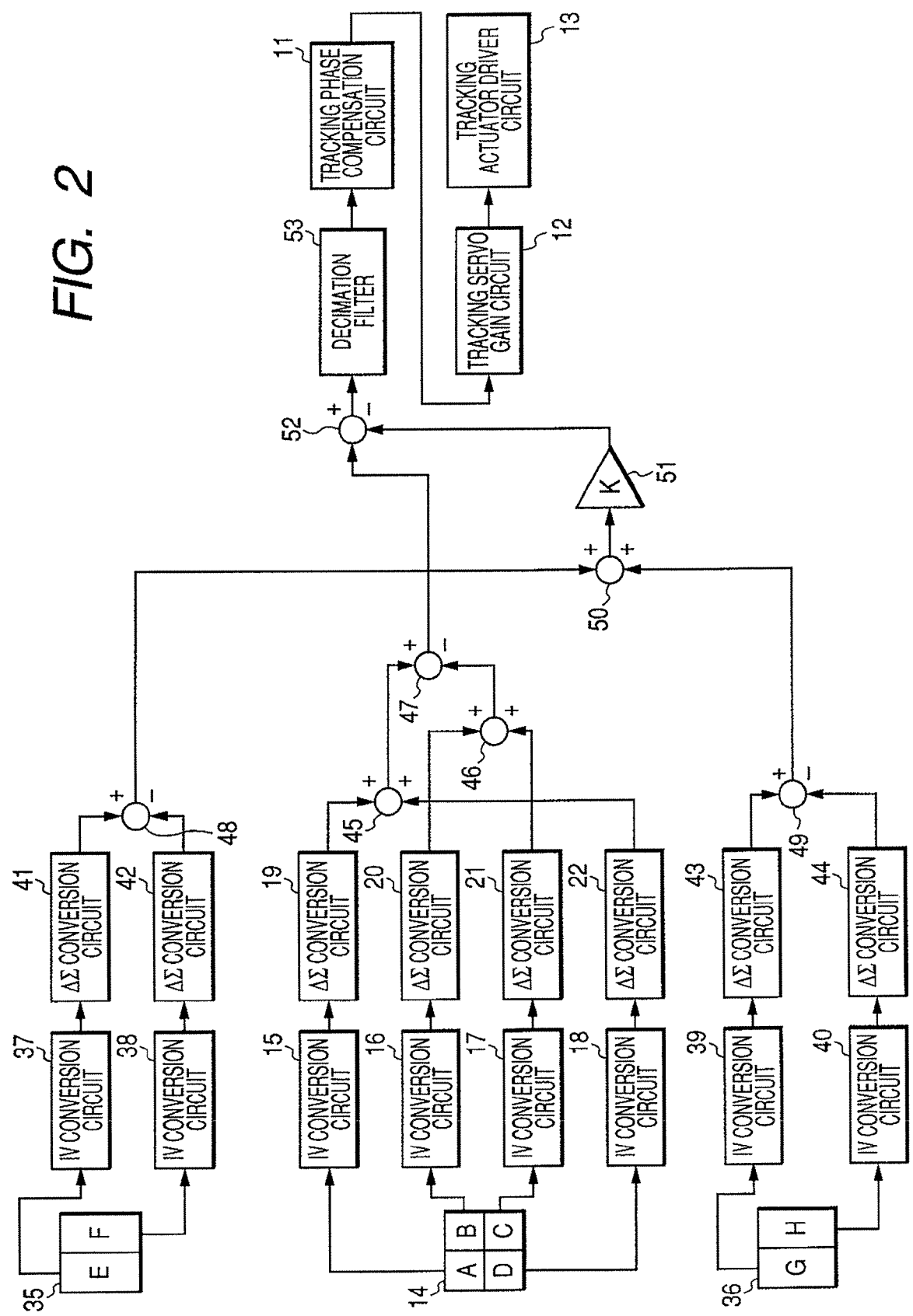
FIG. 2 is a block diagram illustrating second Embodiment of the present invention.

FIG. 2 shows second Embodiment in which a tracking error signal is generated by a differential push-pull method. In FIG. 2, the components which are the same as those shown in FIG. 1 are identified by like numerals. The optical disk 1, the spindle motor 2, the pickup 3, and the other circuits for recording or reproducing information to or from the optical disk 1 as shown in FIG. 6 are not illustrated in FIG. 2. The pickup 3 includes a laser light source, an objective lens, a photosensor 14 having four light receiving portions separated from one another, a focus actuator, and a tracking actuator.

As is the case with the method of generating a focus error signal, a tracking error signal is generated based on the magnitudes of electrical signals corresponding to the amounts of light which is reflected by the optical disk 1 and received by the separated portions of the photosensor. When a tracking error signal is to be generated by a differential push-pull method, a light beam emitted from the laser light source is split into three light beams by a diffraction grating or the like. The three light beams are reflected by the optical disk 1 and the three reflected light beams are received by three photosensors shown in FIG. 2, respectively.

To be specific, a main beam is irradiated to a desired track and the reflected light is received by the photosensor 14 having the four light receiving portions "A" to "D" separated from one another. Further, two sub beams are irradiated to two positions which are each offset by a half track with respect to the desired track and the reflected lights are received by a photosensor 35 having two sensor portions "E" and "F" separated from each other and a photosensor 36 having two sensor portions "G" and "H" separated from each other.

The photosensors 14, 35, and 36 output electrical signals corresponding to the amounts of light incident on the respective light receiving portions "A" to "H", and the respective outputs are converted into voltage signals by the I-V conversion circuits 15-18, 37-38, and 39-40. The outputs from the I-V conversion circuits are input into the AZ conversion circuits 19-22, 41-42, and 43-44), whereby the respective voltage signals are converted into one-bit signals. After the respective sensor outputs are converted into the one-bit signals, the generation of a tracking error signal is preformed by the differential push-pull method.

To be specific, firstly, adders 45 and 46 perform arithmetic operations of A+D and B+C using the one-bit signals, respectively. The outputs of the adders 45 and 46 each have a bit width of two bits. A subtracter 47 performs subtraction between the outputs of the adders 45 and 46, that is, arithmetically operates (A+D)−(B+C). The output from the subtracter 47 has a bit width of three bits. Further, subtracters 48 and 49 perform arithmetic operations of E−F and G−H, respectively.

The outputs of the subtracters 48 and 49 each have a bit width of two bits. An adder 50 performs addition of the outputs from the subtracters 48 and 49 and outputs a result of the arithmetic operation of (E−F)+(G−H). The output from the adder 50 has a bit width of three bits. A multiplier 51 multiplies the output of the adder 50 by a given gain. The value of the gain is determined based on a ratio of the light amounts of the main beam and the sub beams.

When the bit width of the gain of the multiplier 51 is two bits, the output from the multiplier 51 has a bit width of five bits. A subtracter 52 performs subtraction between the output of the multiplier 51 and the output of the subtracter 47. When the bit width of the gain of the multiplier 51 is two bits, the output of the subtracter 52 has a bit width of six bits. The output from the subtracter 52 becomes a tracking error signal according to the differential push-pull method.

The output from the subtracter 52 is input into a decimation filter 53 and converted thereby into data which has a sampling frequency lower than the sampling frequency of the ΔΣ conversion circuits and has a bit width equal to or larger than the bit width (six bits in the above-mentioned case) of the output from the subtracter 52.

The tracking error signal which is the output from the decimation filter 53 is input into the tracking phase compensation circuit 11. The output from the tracking phase compensation circuit 11 is subjected to the multiplication processing of a tracking servo loop gain by the tracking servo gain circuit 12 and then input into the tracking actuator driver circuit 13. A tracking actuator (not shown) in the pickup 3 is driven based on the output from the tracking actuator driver circuit 13, whereby the tracking servo control is performed to control a light spot to be at the center of a desired track on the optical disk 1.

In this embodiment, also in the case of performing the tracking servo control, the voltage signals corresponding to the outputs from the sensors which receive the reflected light from the optical disk are converted into the one-bit signals by the AZ conversion circuits, and the arithmetic operation of the tracking error signal is performed using the one-bit signals. Therefore, a complicated analog circuit is unnecessary. The arithmetic operation of a servo error signal can be performed with a small number of bits. Further, because it is only necessary to provide a single decimation filter, a tracking servo system can be constituted with a very simple circuit structure.

Incidentally, in the present embodiment, description has been made by taking the focus/tracking servo control as an example. However, the present invention can be applied to the case where a lens position signal or the like is to be generated.

Third Embodiment

Figure 3:
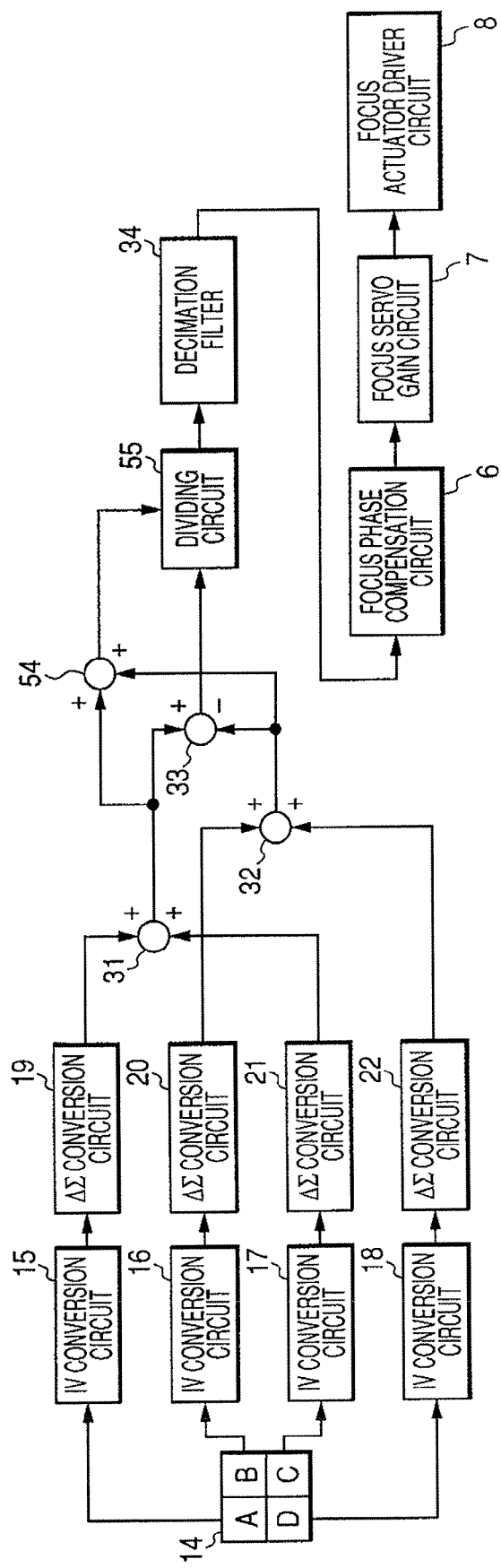
FIG. 3 is a block diagram illustrating third Embodiment of the present invention.

FIG. 3 is a block diagram illustrating third Embodiment of the present invention. In FIG. 3, the blocks which have the same functions as those shown in FIG. 1 are identified by like numerals. FIG. 3 shows in detail a portion related to the generation of a focus error signal according to the present invention. Further, the optical disk 1, the spindle motor 2, the pickup 3, and the other circuits for recording or reproducing information to or from the optical disk 1 as shown in FIG. 6 are not illustrated in FIG. 3. The pickup 3 includes a laser light source, an objective lens, a photosensor 14 having four light receiving portions separated from one another, a focus actuator, and a tracking actuator.

Also in the present embodiment, when the apparatus is turned on, or when a recording or reproduction operation to or from the optical disk 1 is started, the spindle motor 2 rotates. When the rotation number of the spindle motor 2 reaches a predetermined value, the optical disk 1 is irradiated with laser light from the pickup 3. After the laser light source is turned on, the focus/tracking servo control is performed.

In order to generate a focus error signal or a tracking error signal when performing the focus/tracking servo control, the same configurations as those shown in FIGS. 1 and 2 are used. That is, voltage signals corresponding to the outputs from the photosensor which receives a reflected light from the optical disk are converted into one-bit signals by the ΔΣ conversion circuits. Then, the one-bit signals are subjected to addition, subtraction, or multiplication processing to generate a focus error signal or a tracking error signal. The focus/tracking servo control is performed based on the focus error signal or the tracking error signal which is generated by the above-mentioned procedure.

However, an optical disk generally has a variation in the laser light reflectance even within the same plane. Therefore, even when the emission power of a laser light source is the same, the amplitude of a servo error signal generated by using a reflected light from the disk may vary. In order to eliminate the variation in the amplitude, normalization processing in which the servo error signal is divided by a sum signal corresponding to the total amount of light reflected by the optical disk is performed.

In the present embodiment, a method of normalizing a focus error signal by the level of a sum signal will be described in detail. It is assumed that the method of generating a focus error signal in the present embodiment is based on the astigmatic focus error detection method as is the case with first Embodiment shown in FIG. 1. As is the case with first Embodiment shown in FIG. 1, the voltage signals corresponding to the outputs from the photosensors which receive the reflected light from the optical disk are converted into the one-bit signals by the ΔΣ conversion circuits, and the addition and subtraction processing of the one-bit signals is performed to generate a focus error signal.

Further, beside the focus error generation mechanism, an adder 54 is provided to generate a sum signal which corresponds to the total amount of light of the light receiving portions "A" to "D" of the photosensor 14, based on the outputs from the adders 31 and 32. The inputs into the adder 54 each have a bit width of two bits and the output therefrom has a bit width of three bits. The focus error signal and the sum signal which are generated as described above are input into a dividing circuit 55.

The dividing circuit 55 performs the arithmetic operation of (the focus error signal)÷(the sum signal). When the focus error signal is to be generated by the astigmatic focus error detection method, each of the two inputs into the dividing circuit 55 has a bit width of three bits and division processing between three-bit data is performed. Therefore, the output from the dividing circuit 55 has a bit width of six bits.

When the division processing is to be performed, according to the above-mentioned photosensor structure, the sum signal has a bit width of three bits and is input into the dividing circuit 55. Therefore, the dividing circuit 55 has a table of three bits corresponding to the level of the sum signal having the bit width of three bits. The dividing circuit 55 consults the table to obtain a reciprocal of the level of the sum signal and multiplies the focus error signal by the obtained value to perform the normalization processing based on the level of the sum signal.

By performing the normalization processing by use of the dividing circuit 55, the amplitude of the servo error signal can be kept constant without being influenced by a variation in reflectance within the same plane of the optical disk.

The output from the dividing circuit 55 is input into the decimation filter 34 and converted thereby into data which has a sampling frequency lower than the sampling frequency of the $\Delta\Sigma$ conversion circuits and has a bit width equal to or larger than the bit width (six bits in the above-mentioned case) of the output from the dividing circuit 55.

The subsequent operation is identical to that described with reference to FIG. 1. That is, the focus error signal which is the output from the decimation filter 34 is input into the focus phase compensation circuit 6. The output from the focus phase compensation circuit 6 is output to the focus servo gain circuit 7 and subjected to servo gain multiplication processing, and then input into the focus actuator driver circuit 8. The focus actuator is driven based on the output from the focus actuator driver circuit 8 to perform the focus servo control.

In the present embodiment, stable focus servo control can be performed with a simple circuit structure. Further, because it is only necessary that the number of bits of the reciprocal table of the dividing circuit 55 which corresponds to the level of the sum signal is equal to the number of bits corresponding to the level of the sum signal, the table can be constructed with a very small number of bits.

Fourth Embodiment

Figure 4:
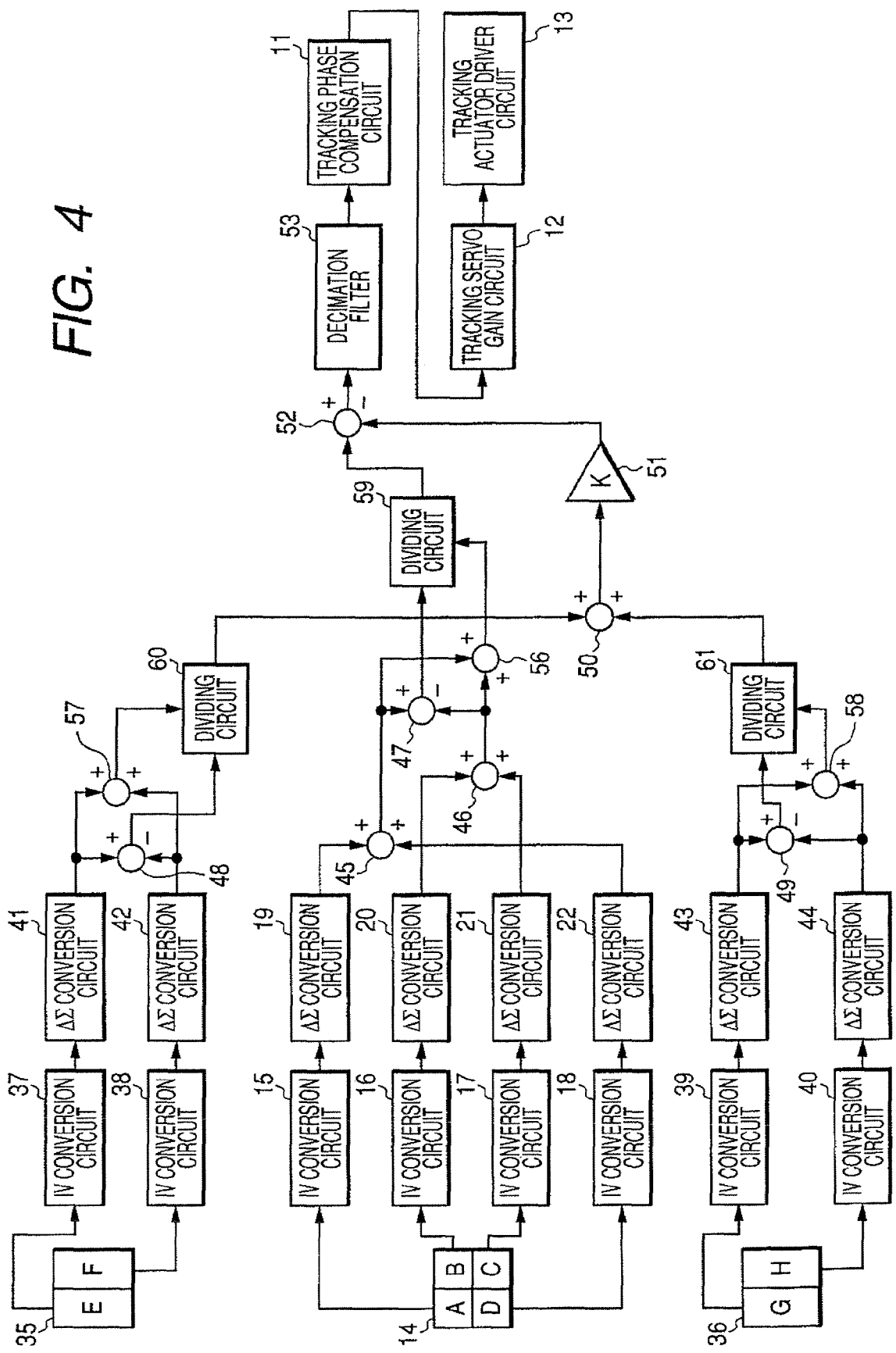
FIG. 4 is a block diagram illustrating fourth Embodiment of the present invention.

FIG. 4 shows fourth Embodiment of the present invention. In FIG. 4, a tracking error signal is generated by the differential push-pull method and normalized using the sum signal as is the case with the embodiment shown in FIG. 3. In FIG. 4, blocks which have the same functions as those shown in FIG. 2 are identified by like numerals. The optical disk 1, the spindle motor 2, the pickup 3, and the other circuits for recording or reproducing information to or from the optical disk 1 as shown in FIG. 6 are not illustrated in FIG. 4. The pickup 3 includes a laser light source, an objective lens, a photosensor 14 having four light receiving portions separated from one another, a focus actuator, and a tracking actuator.

As is the case with the embodiment shown in FIG. 2, when a tracking error signal is to be generated by the differential push-pull method, the subtracter 47 perform subtraction of (A+D)−(B+C) based on the outputs from the photosensor 14 which receives the main beam, and the subtracters 48 and 49, respectively, perform arithmetic operations of (E−F) and (G−H) based on the outputs from the photosensors 35 and 36 which receives the two sub beams, thereby generating push-pull signals from the respective beams.

The outputs from the three subtracters 47, 48, and 49 are input into dividing circuits 59, 60, and 61. In addition to the outputs from the subtracters, outputs from adders 56, 57, and 58 are input into the dividing circuits 59, 60, and 61. The adder 56 performs an arithmetic operation of (A+B+C+D) based on the outputs from the photosensor 14 which receives the main beam, and the adders 57 and 58, respectively, perform arithmetic operations of (E+F) and (G+H) based on the outputs from the photosensors 35 and 36 which receive the two sub beams, thereby generating sum signals from the respective beams.

The output from the adder 56 has a bit width of three bit, and the outputs from the adders 57 and 58 each have a bit width of two bits. The dividing circuits 59, 60 and 61 each derive, from a table provided therein, a reciprocal value corresponding to the level of the sum signal which is the input from the corresponding adder and generated from the main beam or either one of the two sub beams.

As to the number of bits of each of the tables, the table of the dividing circuit 59 into which the sum signal generated from the main beam is input has three bits, and each of the tables of the dividing circuits 60 and 61 into which the sum signals generated from the two sub beams are input has two bits.

Then, each of the dividing circuits multiplies the push-pull signal which is the other input thereinto by the above derived reciprocal value corresponding to the level of the sum signal. The output from the dividing circuit 59 has a bit width of six bits, and the output from each of the dividing circuits 60 and 61 has a bit width of four bits. When each of the dividing circuits performs the multiplication processing, the push-pull signals generated from the main beam and the two sub beams can be normalized by the levels of the sum signals, so that the amplitudes of the push-pull signals can always be kept constant.

After that, as is the case with second Embodiment shown in FIG. 2, the outputs from the dividing circuits 60 and 61 are input into the adder 50 to generate a sum of the normalized push-pull signals resulting from the sub beams. The output from the adder 50 is input into the multiplier 51. The multiplier 51 multiplies the input sum of the push-pull signals resulting from the sub beams by a given gain value. The output from the multiplier 51 and the output from the dividing circuit 59 are input to the subtracter 52, and the output from the subtracter 52 becomes the tracking error signal according to the differential push-pull method.

The output from the subtracter 52 is input into the decimation filter 53 and converted thereby into data which has a sampling frequency lower than the sampling frequency of the $\Delta\Sigma$ conversion circuits and has a bit width equal to or larger than the bit width (six bits in the above-mentioned case) of the output from the subtracter 52.

After that, as is the case with the focus servo control, the tracking error signal which is the output signal from the decimation filter 53 is input into the tracking phase compensation circuit 11. The output from the tracking phase compensation circuit 11 is sent to the tracking servo gain circuit 12 to be subjected to a servo gain multiplication processing and then input into the tracking actuator driver circuit 13. The tracking actuator is driven based on the output from the tracking actuator driver circuit 13 to perform the tracking servo control.

As described above, even when the tracking servo control is to be performed based on the differential push-pull method, the amplitude of the servo error signal can always be kept constant without being influenced by a variation in reflectance within the same plane of the optical disk. Therefore, the stable tracking servo control can be performed. Further, because it is only necessary that the number of bits of the reciprocal tables of the dividing circuits which correspond to the levels of the sum signals are, respectively, equal to the numbers of bits corresponding to the levels of the sum signals generated from the respective beams, the tables can each be constituted with a very small number of bits. As a result, the stable tracking servo control can be performed with a very simple circuit structure.

As described above, according to this embodiment, the servo error signal is normalized with a small number of bits.

Therefore, the stable tracking servo control can be performed with a very simple circuit structure and without being influenced by a variation in reflectance within the same plane of the optical disk and a variation in optical efficiency of an optical element such as an objective lens or a diffraction grating.

Fifth Embodiment

Figure 5:
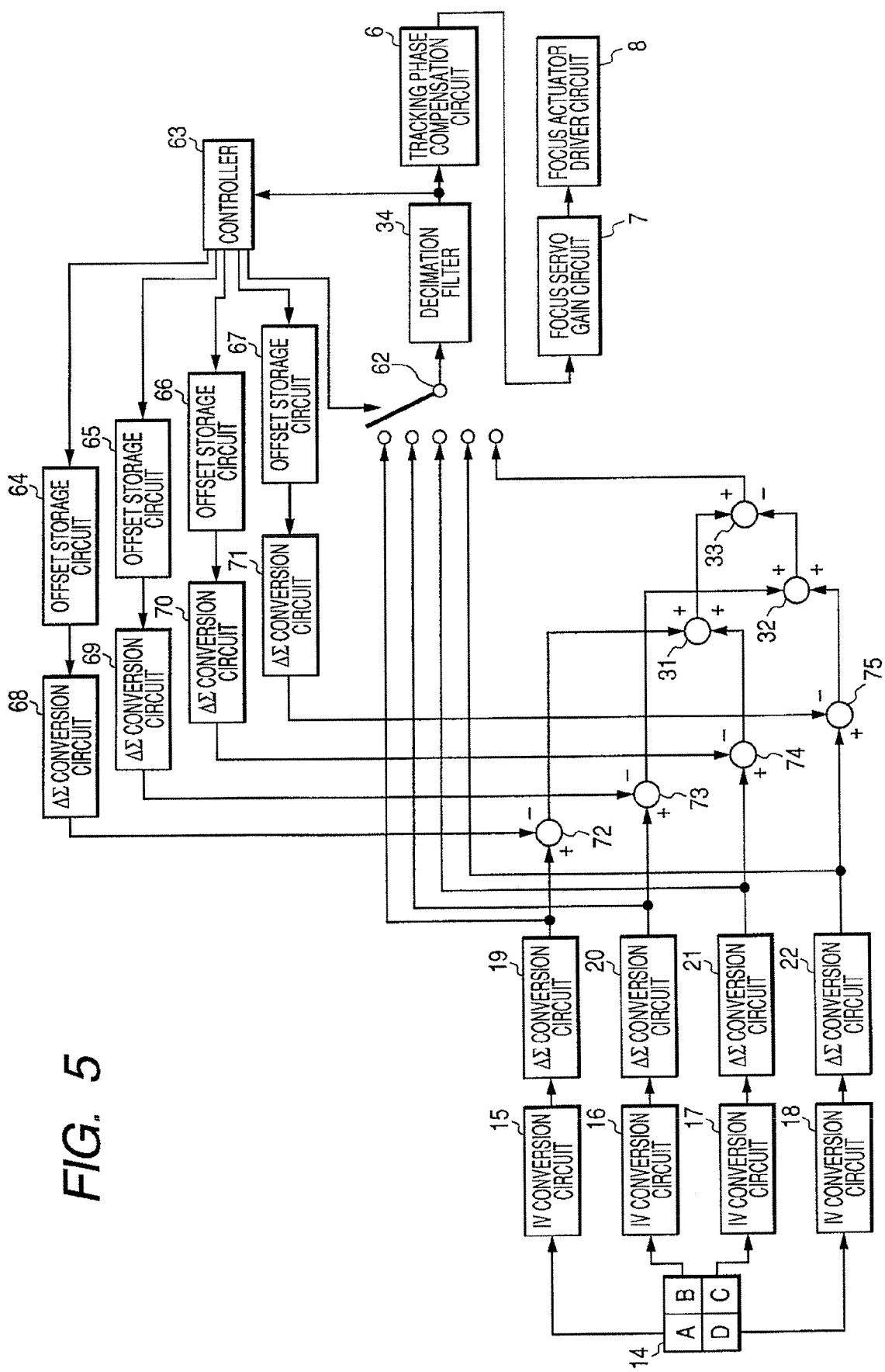
FIG. 5 is a block diagram illustrating fifth Embodiment of the present invention.

FIG. 5 is a block diagram illustrating fifth Embodiment of the present invention. In FIG. 5, blocks which have the same functions as those shown in FIG. 1 or the like are identified by like numerals. The optical disk 1, the spindle motor 2, the pickup 3, and the other circuits for recording or reproducing information on or from the optical disk 1 as shown in FIG. 6 are not illustrated in FIG. 5. The pickup 3 includes a laser light source, an objective lens, a photosensor 14 having four light receiving portions separated from one another, a focus actuator, and a tracking actuator.

In general, a photosensor and an I-V conversion circuit, which are analog circuits, each have an electrical offset. In a state in which such an offset exists, the generated servo error signal will contain an offset. Normally, a state in which a light spot is irradiated to a recording surface of an optical disk in a state of the focus error signal being 0 is referred to as the so-called focused state. However, when an offset is contained in the focus error signal, the focus servo control will not be performed in the worst case unlike the focused state in which the focus error signal is 0.

Therefore, an offset adjusting method according to the present embodiment will be described in detail by taking as an example a focus servo system of generating a focus error signal based on an astigmatic focus error detection method.

When the apparatus is turned on, each of the output values of the I-V conversion circuits 15 to 18 connected to the respective outputs of the photosensors 14 is input into corresponding one of the ΔΣ conversion circuits 19 to 22 before the spindle motor is rotated. The output values of the respective ΔΣ conversion circuits in this state are the above-mentioned offset values. A controller 63 changes over a switch 62 such that the output from the ΔZ conversion circuit 19 is input to the decimation filter 34.

An offset value generated in the I-V conversion circuit 15 is converted into multi-bit data by the decimation filter 34, and the controller 63 allows an offset storage circuit 64 to store the multi-bit data. After the offset value generated in the I-V conversion circuit 15 is stored in the offset storage circuit 64, the controller 63 changes over the switch 62 such that the output from the ΔΣ conversion circuit 20 is input to the decimation filter 34.

As is the case with the input of the output from the ΔΣ conversion circuit 19, an offset value generated in the I-V conversion circuit 16 is converted into multi-bit data by the decimation filter 34, and the controller 63 allows an offset storage circuit 65 to store the multi-bit data. Similarly, outputs from the ΔΣ conversion circuits 21 and 22 are sequentially input into the decimation filter 34 through the change-over of the switch 62, and values obtained by the conversion into multi-bit data are stored in offset storage circuits 66 and 67 as offset values generated in the I-V conversion circuits 17 and 18, respectively.

After the offset values generated from all the sensor portions of the photosensor 14 have been stored in the offset storage circuits 64 to 67 as described above, the spindle motor is rotated. After that, the laser light source is turned on to shift the operation to a normal focus servo operation. Further, the controller 63 changes over the switch 62 such that the output from the subtracter 33 is input into the decimation filter 34.

After the switch 62 has been changed over, the output from a ΔΣ conversion circuit 68 is input into a subtracter 72. At that time, the offset value stored in the offset storage circuit 64 is input to the ΔΣ conversion circuit 68 and converted into one-bit data by the ΔΣ conversion circuit 68. The offset value converted into the one-bit data is input to an input terminal of the subtracter 72. Into another input terminal of the subtracter 72 is input a signal from the ΔΣ conversion circuit 19 which is derived from the light receiving portion "A" of the photosensor 14.

When the laser light source is turned on in this state, the offset value stored in the offset storage circuit 64 is removed from the output of the ΔΣ conversion circuit 19 which is derived from the light receiving portion "A" of the photosensor 14, so that the electrical offset is completely removed from the output of the subtracter 72. Therefore, there is obtained an electrical signal based on only the amount of light which has been incident on and received by the light receiving portion "A" of the photosensor 14.

In the same manner, the multi-bit data of the offset value stored in the offset storage circuit 65 is converted into one-bit data by a ΔΣ conversion circuit 69 and then input to a subtracter 73. The output from the ΔΣ conversion circuit 20 is input into another input terminal of the subtracter 73, with the result that the electrical offset can be removed from the electrical signal of the light receiving portion "B" of the photosensor 14. In the same manner, with offset storage circuits 66 and 67 and subtracters 74 and 75, electrical offsets are removed from the electrical signals of the light receiving portions "C" and "D" of the photosensor 14 to thereby generate signals.

After the electrical offset is removed from each of the outputs from the photosensors 14 as described above, as in the case of the above-mentioned embodiments, a focus error signal is generated based on the outputs of the sensor portions "A" to "D" of the photosensor 14 by the astigmatic focus error detection method to perform the focus servo control.

As described above, when the apparatus is turned on, the operation is not immediately shifted to the focus servo operation, and firstly the output values of the respective sensor portions are stored while the laser light source is not turned on, the offset values are subtracted from the outputs of the respective sensor portions before the operation is shifted to the focus servo operation, and the focus servo operation is then performed. Therefore, a point in which the focus error signal becomes 0 coincides with the focused focal point of the light spot, so that the focus servo control can be performed with higher accuracy.

Incidentally, in the present embodiment, description has been made by taking as an example the offset removal in the case where the focus error signal is generated. However, according to the present invention, an offset can be removed in the same manner even in the case where a tracking error signal is to be generated. That is, also in the case where the tracking error signal is generated by the differential push-pull method as described in the previous embodiments, when the apparatus is turned on, the offset values of the respective sensor portions are stored before the spindle motor rotates. After the offset values have been stored, the stored offset values of the respective sensor portions are subtracted from the outputs from the sensor portions at the time of the tracking servo control to remove the electrical offset from each of the outputs of the sensor portions.

By generating the tracking error signal based on the sensor outputs in the sate in which the offsets are removed, and performing the tracking servo control by use of the tracking error signal, a point in which the tracking error signal becomes zero coincides with the center of a target track, so that the tracking servo control can be performed with higher accuracy.

As described above, according to the present embodiment, electrical offsets appearing in sensor outputs are converted into digital values by ΔΣ conversion circuits and a decimation filter at the time of turning-on of the apparatus, and when focus/tracking servo control is to be performed, the offset values are subtracted from the outputs of the respective sensor portions. Therefore, focus/tracking servo control can be performed with higher accuracy.

Further, with the configuration according to the present embodiment, it is only necessary to additionally provide a ΔΣ conversion circuit and an offset storage circuit for each of the sensor outputs. As the decimation filter of converting the offset value into the multi-bit data, the decimation filter which is actually used for servo control can be used only at the time of turning-on of the apparatus, so that highly accurate focus/tracking servo control can be performed without a significant increase in the circuit scale.

Further, the processing for subtracting the offset value from the sensor output is an arithmetic operation between one-bit signals, so that the offset can be removed with a very simple configuration. Moreover, the present invention is not limited to the removal of offsets at the time of turning-on of the apparatus but can also be applied to cope with the time-dependent change of offsets. For the latter purpose, there may be adopted a configuration such that the offset value of the ΔΣ conversion circuit may be restored after the elapse of a predetermined period of time after the turning-on of the apparatus, for example, during a period of time in which the laser light source is turned off, such as a period in which the optical disk is exchanged for another disk. According to such configuration, the time-dependent change of offsets can be coped with accurately and accurate servo control can always be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-052557, filed Feb. 28, 2006, which is hereby incorporated by reference herein in its entirety.

What is claimed is:

1. An information/reproducing apparatus, comprising:
a photosensor having a plurality of divided portions, for receiving a reflected light from an information recording medium;
a plurality of ΔΣ conversion circuits for convening analog output signals from the plurality of divided portions of the photosensor into one-bit digital outputs;
an arithmetic circuit for arithmetically operating the one-bit output signals of the plurality of ΔΣ conversion circuits to generate an n-bit (n>1) servo error signal;
a decimation filter for convening the servo error signal from the arithmetic circuit into an in-bit (m>n) servo error signal; and
a normalization circuit for dividing the servo error signal generated in the arithmetic circuit by a sum signal corresponding to a sum of the photosensor outputs generated based on the outputs from the plurality of ΔΣ conversion circuits, thereby normalizing the servo error signal.

2. An information/reproducing apparatus,
a photosensor having a plurality of divided portions, for receiving a reflected light from an information recording medium;
a plurality of ΔΣ conversion circuits for convening analog output signals from the plurality of divided portions of the photosensor into one-bit digital outputs;
an arithmetic circuit for arithmetically operating the one-bit output signals of the plurality of ΔΣ conversion circuits to generate an n-bit (n>1) servo error signal;
a decimation filter for convening the servo error signal from the arithmetic circuit into an in-bit (m>n) servo error signal;
a normalization circuit for dividing the servo error signal generated in the arithmetic circuit by a sum signal corresponding to a sum of the photosensor outputs generated based on the outputs from the plurality of ΔΣ conversion circuits, thereby normalizing the servo error signal; and
wherein the normalization circuit comprises a table containing a result of a reciprocal operation of an input signal which corresponds to a divisor in a division operation and multiplies the input signal corresponding to a dividend and the result of the reciprocal operation to thereby perform normalization processing.

3. An information/reproducing apparatus, comprising:
a photosensor having a plurality of divided portions, for receiving a reflected light from an information recording medium;
a plurality of ΔΣ conversion circuits for converting analog output signals from the plurality of divided portions of the photosensor into one-bit digital outputs;
an arithmetic circuit for arithmetically operating the one-bit output signals of the plurality of ΔΣ conversion circuits to generate an n-bit (n>1) servo error signal; and
a decimation filter for converting the servo error signal from the arithmetic circuit into an in-bit (m>n) servo error signal; and
offset storage circuits for respectively converting offset values contained in the outputs of the plurality of divided portions of the photosensor into one-bit digital values by the plurality of ΔΣ conversion circuits and then respectively converting the one-bit digital values into in-bit (m>1) digital values by the decimation filter and storing the in-bit digital values, in a state in which a light source for recording or reproduction is turned off; and
a second ΔΣ conversion circuit for converting the in-bit digital values stored in the offset storage circuits into one-bit digital values,
wherein when servo control is performed, the offset values contained in the outputs of the photosensor are removed by subtracting the offset values converted into the one-bit digital values by the second ΔΣ conversion circuits from the outputs of the photosensor converted into the one-bit digital values by the plurality of ΔΣ conversion circuits.

* * * * *